United States Patent
Orsley

(10) Patent No.: US 7,905,567 B2
(45) Date of Patent: Mar. 15, 2011

(54) CLOSED-LOOP PRINTING REGISTRATION SYSTEMS, DEVICES, COMPONENTS AND METHODS

(75) Inventor: Timothy James Orsley, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 379 days.

(21) Appl. No.: 12/122,646

(22) Filed: May 16, 2008

(65) Prior Publication Data

US 2009/0285590 A1    Nov. 19, 2009

(51) Int. Cl.
*B41J 29/393*    (2006.01)
(52) U.S. Cl. .......................................................... 347/19
(58) Field of Classification Search .................... 347/14, 347/19, 105, 101
See application file for complete search history.

(56) References Cited

U.S. PATENT DOCUMENTS

| | | |
|---|---|---|
| 4,856,903 A | 8/1989 | Kipphan et al. |
| 4,878,753 A | 11/1989 | Nestmeier |
| 5,182,571 A | 1/1993 | Creagh et al. |
| 5,287,162 A | 2/1994 | de Jong et al. |
| 5,600,350 A | 2/1997 | Cobbs et al. |
| 5,786,804 A | 7/1998 | Gordon et al. |
| 5,796,414 A | 8/1998 | Sievert et al. |
| 5,980,016 A | 11/1999 | Nelson et al. |
| 6,386,671 B1 * | 5/2002 | Huston et al. ................. 347/16 |
| 6,433,780 B1 | 8/2002 | Gordon et al. |
| 6,572,213 B2 | 6/2003 | Valero |
| 6,995,748 B2 | 2/2006 | Gordon et al. |
| 2003/0098897 A1 * | 5/2003 | Hoshino et al. ............. 347/19 |

OTHER PUBLICATIONS

HP UV/IR Invisible Ink System, 2003, Hewlett-Packard Development Company. L.P., Pub. No. 5981-6818EN.

* cited by examiner

*Primary Examiner* — Lamson D Nguyen

(57) ABSTRACT

Closed-loop printing registration systems (e.g., printers), devices, components and methods are provided. In one embodiment, a printer reproduces continuously and sequentially on a sheet of paper invisible ink landmarks that mimic registration information provided initially by permanent invisible ink markers disposed on a platform or platen. According to one embodiment, once the first row of invisible ink landmarks has been printed on a sheet of paper, the first and subsequent rows of invisible ink landmarks provide a basis for continuous registration and alignment of sheet of the paper as it is being printed upon and advanced through the printer. In other embodiments, one or two invisible ink landmarks dispensed on a sheet of paper, preferably in combination with a sensed edge or corner of a sheet of paper, provide sufficient information for a sheet of paper to be registered and aligned initially with respect to a print head or carriage, and for subsequent invisible ink landmarks to be deposited on the sheet of paper at locations which are determined.

16 Claims, 8 Drawing Sheets

CLOSED-LOOP PRINTING REGISTRATION SYSTEMS, DEVICES, COMPONENTS AND METHODS

FIELD OF THE INVENTION

Various embodiments of the invention described herein relate to the field of printing systems, devices, components and methods.

BACKGROUND

Many current printers do not directly monitor the position of the paper relative to the print head, but rather rely upon encoders on the paper feeder roller and on the print head carriage. Such an approach places a higher burden on printer mechanics to effect paper registration, and also limits printing resolution.

Using an imager similar to those found in some optical mice to provide closed loop feedback during printing is also known. Previous efforts along these lines ran into difficulties, however, mainly due to accumulated error. That is, while absolute position of a sheet of paper in a printer might be known initially by referencing, for example, the upper left-hand corner of the sheet, as printing progresses slight errors from frame to frame can accumulate and result in significant offset between true and calculated paper positions.

One way to overcome problems associated with accumulated errors is to is use pre-printed paper, such as that provided in the ANOTO™ digital pen system (see, for example, http://www.anoto.com/?id=906). Unfortunately, not only is special paper required in such a system, but registration landmarks disposed on the paper may be visible, which detracts from the perceived quality of the printed output.

What is need is a printing registration system that is not expensive, commercially viable, accurate, permits high-speed printing, and that does not accumulate positional errors.

SUMMARY

In some embodiments, there is provided a closed-loop printing registration system comprising a sensor assembly comprising a plurality of invisible ink sensors, a platform having a plurality of permanent invisible ink markers disposed thereon, therein or thereunder, a paper feeding mechanism, a visible ink dispenser, and an invisible ink dispenser, where the platform and paper feeding mechanism are configured to align an edge of a sheet of paper with at least portions of the permanent invisible ink markers, the sensor assembly is configured to be aligned with at least portions of the permanent invisible ink markers, the invisible ink dispenser is configured to dispense a plurality of invisible ink paper registration landmarks onto the sheet in response to the sensors detecting one or more of at least some of the permanent invisible ink markers and at least some of the invisible ink landmarks, the sensor assembly further being configured to be aligned with at least portions of the invisible ink landmarks, and the platform and paper feeding mechanism are further configured to align the edge with at least portions of invisible ink landmarks that have been dispensed on the sheet.

In other embodiments, there is provided an ink cartridge for a closed-loop printing registration system, the system comprising a sensor assembly comprising a plurality of invisible ink sensors, a platform having a plurality of permanent invisible ink markers disposed thereon, therein or thereunder, a paper feeding mechanism, the platform and paper feeding mechanism being configured to align an edge of a sheet of paper with at least portions of the permanent invisible ink markers, the sensor assembly being configured to be aligned with at least portions of the permanent invisible ink markers, the cartridge comprising a visible ink dispense, and an invisible ink dispenser, wherein the invisible ink dispenser is configured to dispense a plurality of invisible ink paper registration landmarks onto the sheet in response to the sensors detecting one or more of at least some of the permanent invisible ink markers and at least some of the invisible ink landmarks, the sensor assembly is further configured to be aligned with at least portions of the invisible ink landmarks, and the platform and paper feeding mechanism are further configured to align the edge with at least portions of invisible ink landmarks that have been dispensed on the sheet.

In still other embodiments, there is provided a method of registering a sheet of paper in a printer comprising aligning an edge of a sheet of paper with at least portions of one or more permanent invisible ink markers disposed on, in or under a platform located beneath or above the sheet, aligning at least portions of a sensor assembly with one or more of at least portions of the one or more permanent invisible ink markers and at least portions of one or more invisible ink landmarks that have previously been dispensed on the sheet, and dispensing a plurality of invisible ink paper registration landmarks onto the sheet of paper in response to the sensors detecting at least one of at least some of the permanent invisible ink markers and at least some of the invisible ink landmarks.

In yet further embodiments, there is provided a method of registering a sheet of paper in a printer comprising aligning an edge and a corner of a sheet of paper with a sensor assembly or an imager, dispensing an invisible ink paper registration landmark onto the sheet of paper, determining the position of the invisible ink landmark using the sensor assembly or the imager, and registering or aligning a print carriage in respect of the sheet of paper on the basis of the position of the invisible ink landmark.

In yet another embodiment, there is provided a closed-loop printing registration system comprising at least one sensor or imager configured to detect invisible ink landmarks on a sheet of paper, a print carriage, a processor, operably connected to the sensor or imager and configured to determine the locations of the invisible ink landmarks on the sheet of paper, and means, operably connected to the processor, for aligning and registering the sheet of paper in respect the print carriage on the basis of the locations determined by the processor.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

In various embodiments of the invention, closed-loop printing registration systems (e.g., printers), devices, components and methods are provided.

Figure 1:
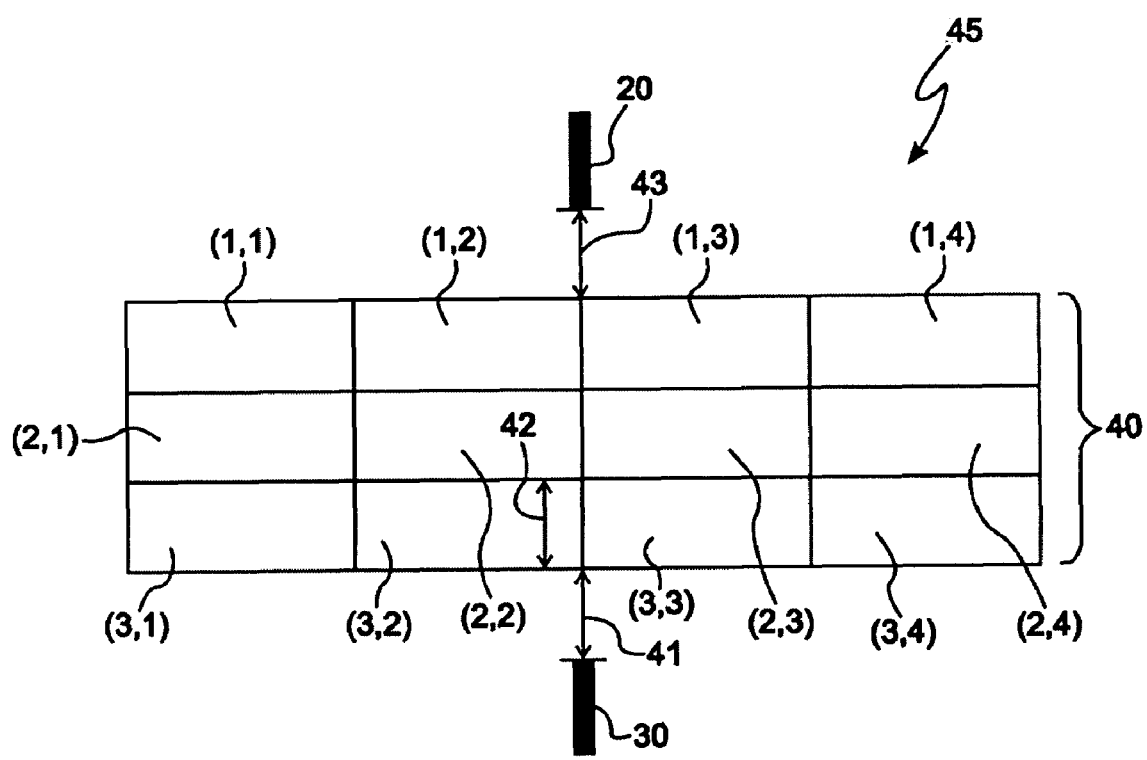
FIG. 1 shows one embodiment of combined ink dispenser and sensor assembly 45.

FIG. 1 shows one embodiment of combined ink dispenser and sensor assembly 45 comprising sensor array 40, visible ink dispenser 20, and invisible ink dispenser 30. In the embodiment shown in FIGS. 1 through 7, sensor assembly array 40 comprises 3 rows and four columns of sensors, which are designated in the Figures as sensor (1,1) (first row, first column, upper left-hand-most sensor) through sensor (3,4) (third row, fourth column, lower right-hand-most sensor). Note that many configurations of sensor array 40 other than the embodiment illustrated in FIGS. 1 through 7 are possible, such as sensor array 40 containing more or fewer sensors, more or fewer rows and/or columns, spaces between sensors, and so on.

Note further that in the embodiment shown in FIG. 1, ink dispensers 20 and 30 are located at distances 43 and 41 from the edge of sensor array 40, which distances are equal to height 42 of any of the sensor cells corresponding to sensors (1,1) through (3,4) in sensor array 40 of FIG. 1. Although many other configurations and spacings for ink dispensers 20 and 30 respecting sensor array 40 are possible and contemplated in the present invention, the arrangement illustrated in FIG. 1 finds particularly efficacious use owing to its automatic registration of subsequently printed rows of invisible ink landmarks, more about which is said below.

The sensors in array 40 are configured to detect the presence of permanent invisible ink marks 100a-100i disposed on platform, or platen 90 (not shown in FIG. 1) and the presence of invisible ink landmarks (e.g., 151a-151i) disposed on paper 120 (also not shown in FIG. 1). According to some embodiments, sensors (1,1) through (3,4) are photodetectors which are sensitive to infra-red (IR) and/or ultraviolet (UV) light reflected by invisible ink marks 100a-100i and/or invisible ink landmarks 151a-151i, where the invisible ink or other substance employed to form invisible ink marks 100a-100i and/or invisible ink landmarks 151a-151i is configured to reflect light in the IR and/or UV bands and thus be invisible to the human eye under "normal" ambient white light conditions. See, for example, the HEWLETT PACKARD™ C6121A UV/IR invisible ink system, invisible ink suitable for use in some embodiments of the invention are employed, and where ink is provided that reflects in the IR or UV spectrum outside of the wavelengths of human perception. Such ink is currently used in some HEWLETT PACKARD™ printers for security purposes such as in the C6121A printer system referenced above. As discussed below in further detail, other types of sensors and invisible ink may also be employed, such as mouse-like imaging systems configured to permit a sheet of paper or be registered in respect of a carriage (or vice versa) by comparing sequential frames of the sheet of paper acquired by the system to one another. In such imaging systems, landmarks may or may not be dispensed or otherwise present on the sheet of paper.

According to one embodiment of combined ink dispenser and sensor assembly 45, sensor assembly 40 is provided as a component physically separate from, or as a component which may be separated from, ink dispensers 20 and 30. In one such embodiment, a removable and replaceable ink cartridge containing visible ink dispenser 20 and invisible ink dispenser 30 (and corresponding reservoirs of ink for dispensers 20 and 30), is provided which is configured to be attached to and removed from a print carriage having sensor array 40 attached thereto or otherwise operably associated therewith. In a preferred embodiment, attachment of the ink cartridge to the print carriage automatically registers the ink cartridge and the ink dispensers in respect of the print carriage and sensor array 40.

In another embodiment, removable and replaceable ink cartridges for each of visible ink dispenser 20 and invisible ink dispenser 30 are provided, which are each configured to be attached to and removed from a print carriage having sensor array 40 attached thereto or otherwise operably associated therewith. In other embodiments, a replaceable or removable ink cartridge is provided having sensor array 40 incorporated therein along with one or both of ink dispensers 20 and 30 (and corresponding reservoirs of ink). In further embodiments, ink reservoirs are provided in replaceable cartridges separate and apart from ink dispensers 20 and 30, or separate and apart from the carriage. Alternatively, ink reservoirs may be provided in a cartridge in conjunction with either or both ink dispensers 20 and 30. Finally, ink dispensers 20 and 30 may be incorporated into the print carriage, and one or more removable and replaceable ink cartridges containing reservoirs for invisible ink and visible ink may be configured to be mounted on or removed from the carriage.

Figure 2:
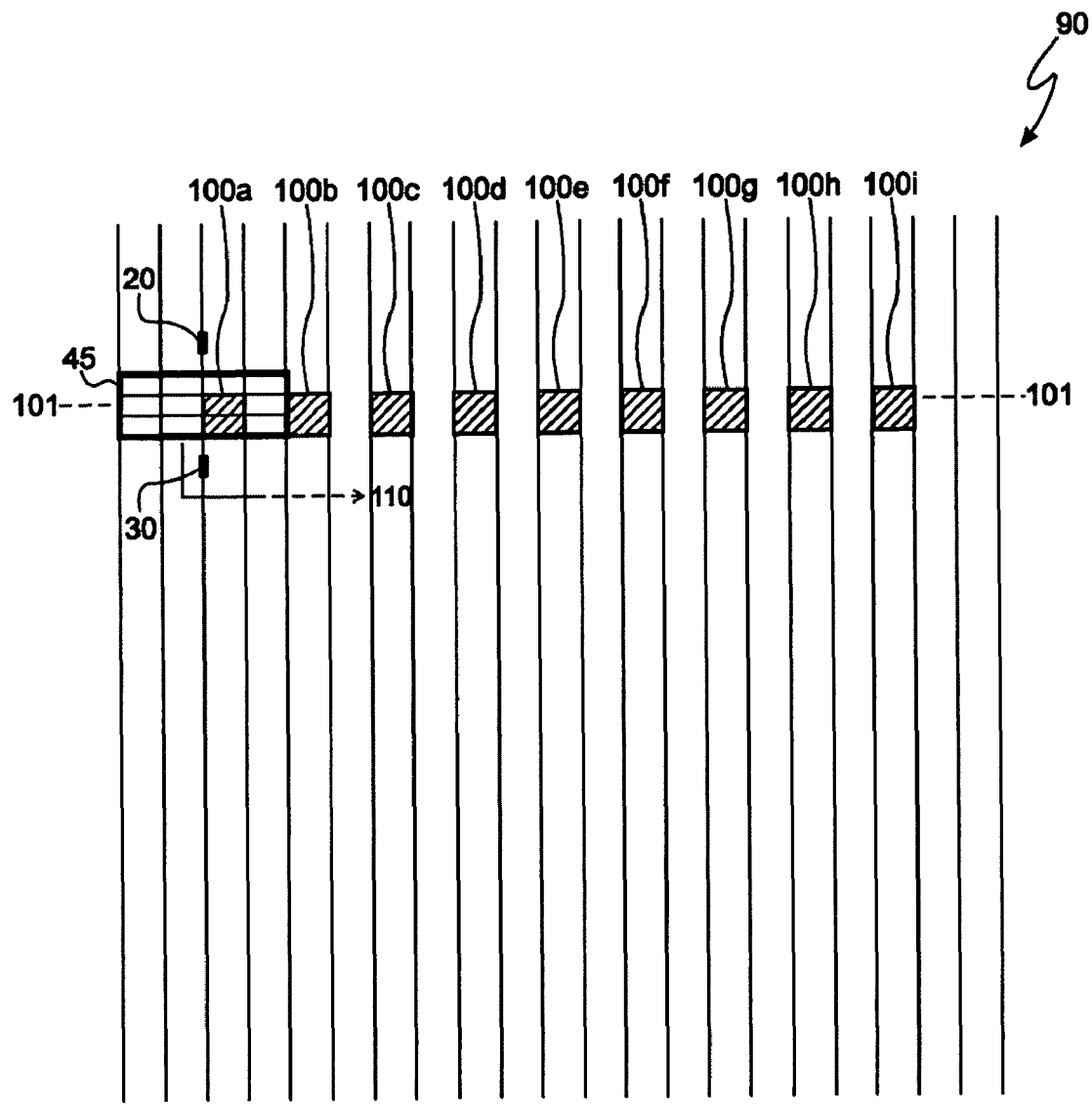
FIG. 2 shows one embodiment where assembly 45 aligns with permanent invisible ink markers 100a-100i disposed on platform 90.

Referring now to FIG. 2, there is shown platform or platen 90 of system or system or printer 10 having permanent invisible ink markers 100a-100i disposed along row 101 on platform or platen 90, which in the embodiment illustrated in FIGS. 2 through 7 is configured to be disposed beneath sheet of paper 120 (not shown in FIG. 2) as sheet 120 advances through system or printer 10. Note that permanent invisible ink markers 100a through 100i may be formed on, in or beneath platform or platen 90 so long as they can be detected by the sensors in sensor array 40. There are a variety of different methods and means by which permanent invisible ink markers 100a-100i may be formed, printed, inked, installed or otherwise provided on platform 90, such as providing metal or plastic rectangles or squares in platform 90 which are reflective of UV or IR light, or printing such rectangles or squares onto platform 90 using permanent ink or other suitable materials capable of resisting wear and providing detection capability.

FIG. 2 shows assembly 45 aligned with permanent invisible ink marker 100a on the left-hand side of platform 90. Sensor (3,3) of sensor assembly 40 is aligned with the bottom half of permanent invisible ink marker 100a, which in the embodiment illustrated in FIGS. 1 and 2 is one of nine permanent invisible ink markers disposed along row 101. The printer carriage upon which assembly 45 is mounted is configured to move in horizontal direction 110 along row 101 such that the various sensors in sensor array can detect permanent invisible ink landmarks markers 100*a* through 100*i* disposed along row 101.

Figure 3:
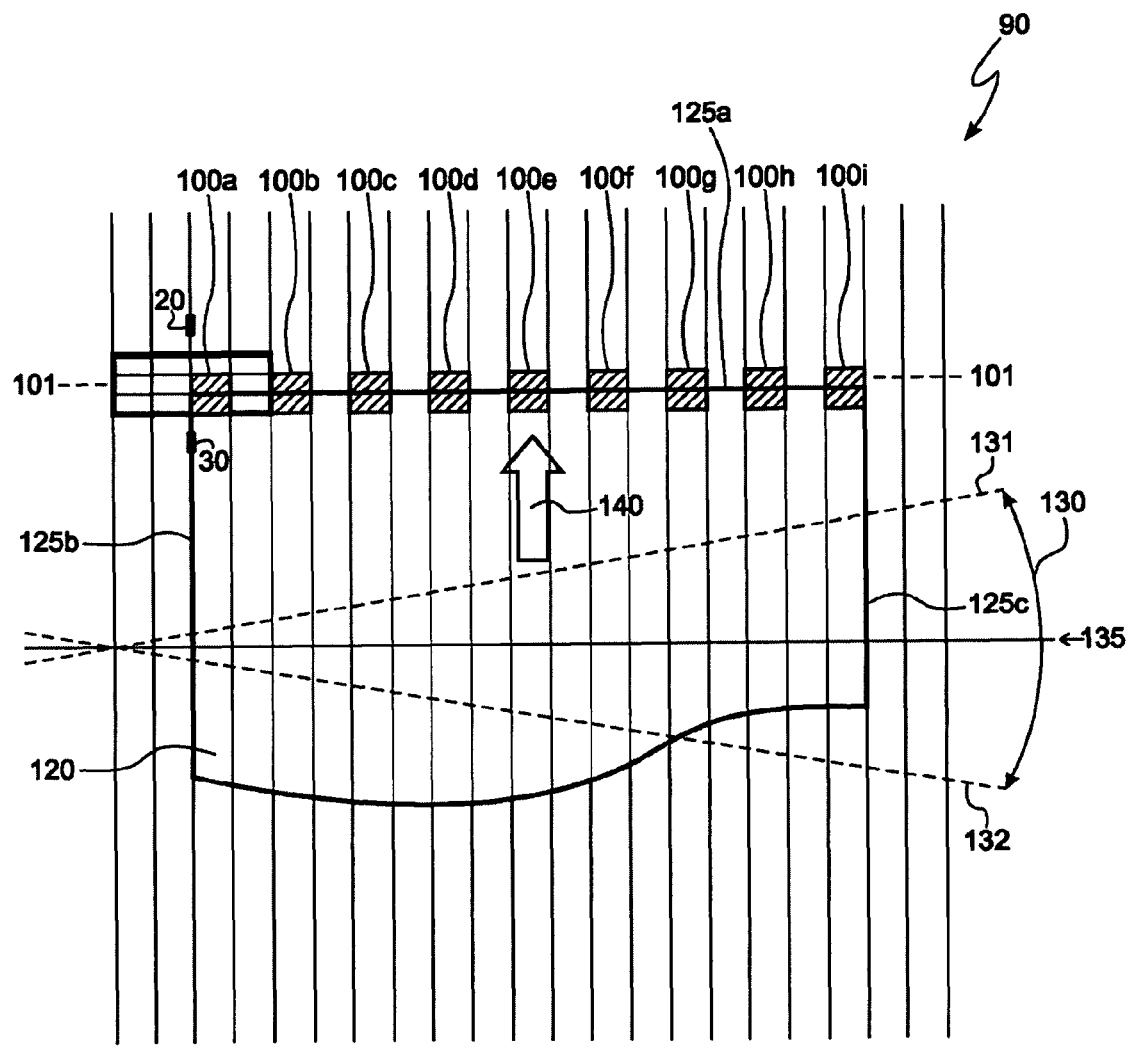
FIG. 3 shows edge 125a of sheet of paper 120 being aligned with portions of invisible ink markers 100a-100i disposed on platform 90.

FIG. 3 shows top edge 125*a* of sheet of paper 120 being aligned with portions of invisible ink markers 100*a*-100*i* disposed on platform 90. When sheet of paper 120 is fed into system or printer 10, there is nothing to say that top edge 125*a* of paper 120 will be square with the horizontal travel of the carriage holding sensor array 40 and ink dispensers 20 and 30. Accordingly, provision is made in system or printer 10 to align and register paper 120 in respect of the carriage and sensor assembly 45 by configuring platform or platen 90 to pivot by an amount and in a direction required to effect such alignment and registration using a yaw positioning mechanism, as indicated by arrows 130.

A closed feedback loop is established by microcontroller 80 (see FIG. 8) using the sensors of sensor array 40 to detect one or more positions of permanent invisible ink markers 100*a* through 100*i* in respect of assembly 45 and the carriage, and on that basis to pivot platform or platen 90 using the yaw positioning mechanism as required to register and align platform or platen 90 in respect of assembly 45 and sheet of paper 120. By implementing a closed loop feedback system for ink deposition during the printing process, higher output quality can be achieved with improved registration and higher resolution. The closed loop system can also permit low cost mechanics to be employed.

Figure 4:
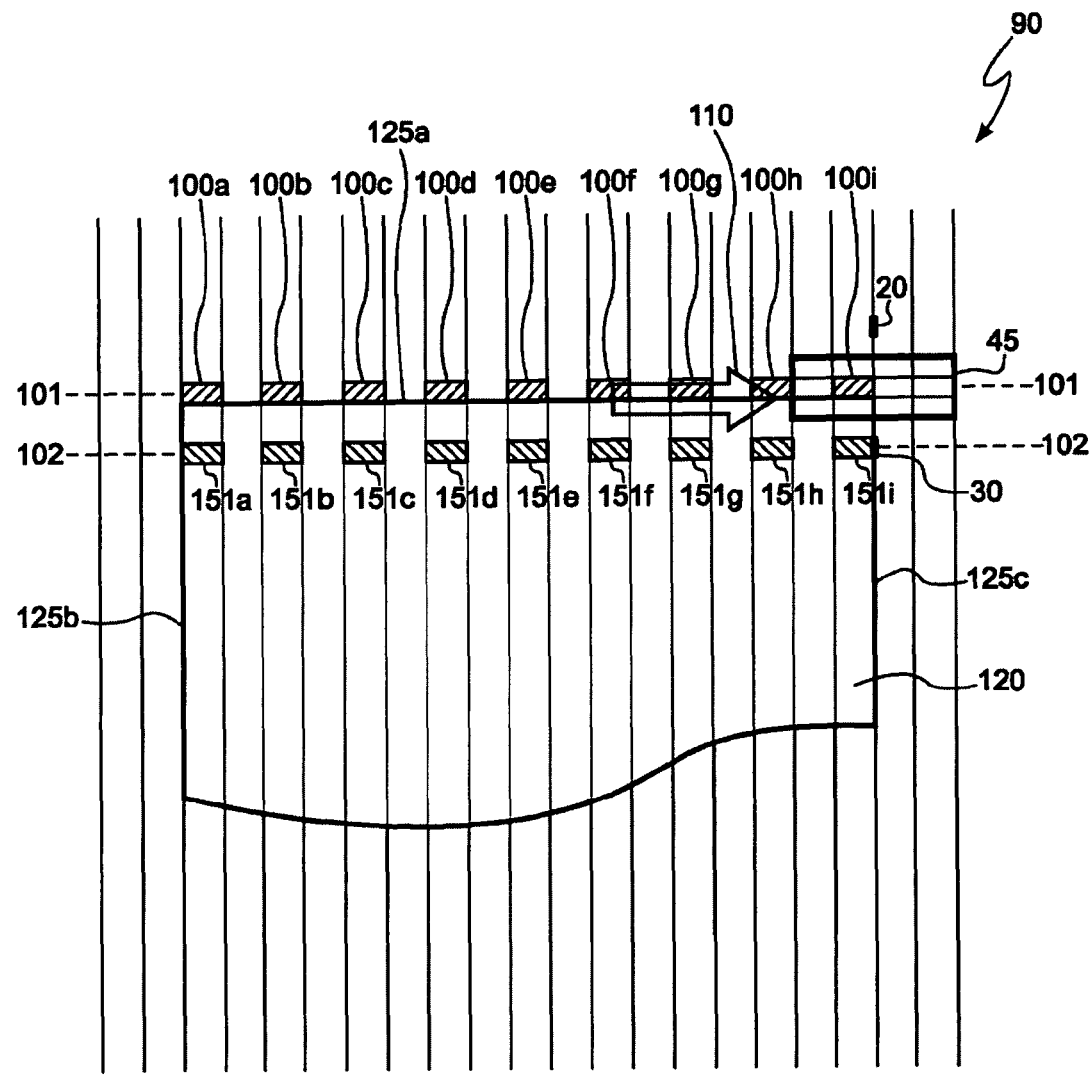
FIG. 4 shows assembly 45 dispensing invisible ink landmarks 151a-151i along row 102 on sheet of paper 120.

Note that for the sake of clarity, all portions of invisible ink markers 100*a* through 100*i* are shown in FIG. 3 despite the bottom halves thereof actually being located beneath sheet of paper 120. In FIG. 4 such bottom halves of permanent invisible ink markers 100*a* through 100*i* are not shown.

According to the embodiment illustrated in FIG. 3, when permanent invisible ink markers 100*a* through 100*i* have been consistently covered half-way across by top edge 125*a* of paper 120 as indicated by measurements obtained using sensor array 40 of assembly 45 and the feedback control system described above, the targeted degree of parallelism, alignment and registration of paper 120 in respect of the carriage have been achieved. At that point, and as further illustrated in FIG. 4, the exposed portions of invisible ink permanent markers 100*a* through 100*i* are employed by sensor array 40 to trigger dispensing invisible ink from dispenser 30 at locations along second row 102 that correspond vertically to those of invisible ink permanent markers 100*a* through 100*i*' in first row 101, and thereby form invisible ink landmarks 151*a* through 151*i* on sheet of paper 120. Once this step has been accomplished, permanent markers 100*a* through 100*i* no longer need to be used to register paper, 120 in respect of assembly 45. Instead, thereafter the most recently deposited row of invisible ink landmarks is employed to write a new row of invisible ink landmarks therebeneath, and to write visible ink thereabove.

Should misalignment be caused by, say, the uneven feeding of paper 120, registration can be re-established by having sensor array 40 and microcontroller 80 refer to the most recently written invisible ink landmarks. By pivoting and adjusting paper 120 in respect of such most recently written invisible ink landmarks, alignment and registration in respect of permanent invisible ink markers 100*a* through 100*i* occurs by inference. According to one embodiment, therefore, such permanent markers are not detected or measured after the first row of invisible ink landmarks has been deposited, and need only used during the initial writing of the first row of invisible ink landmarks.

Figure 5:
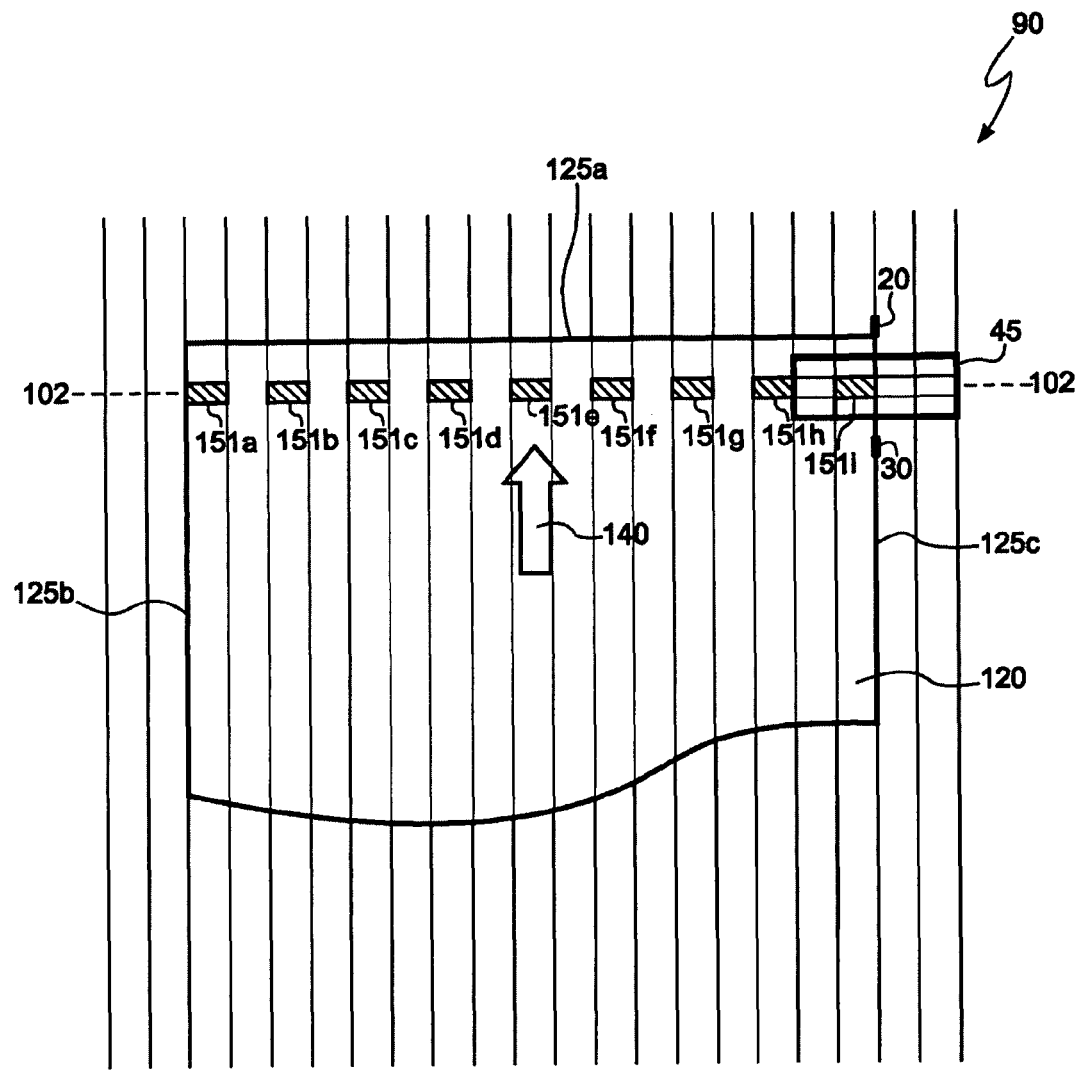
FIG. 5 shows assembly 45 aligning with invisible ink landmark 151i on sheet of paper 120 after paper 120 has been advanced in upward direction 140.

In FIG. 5, after invisible ink landmarks 151*a* through 151*i* have been deposited along second row 102, sheet of paper 120 is advanced vertically upwards on platform or platen 90 by a paper advance mechanism, and if necessary a yaw positioning mechanism is activated as described above, until sheet of paper 120 has been appropriately registered and aligned respecting assembly 45. When the paper is advanced such that sensor array 40 moves from one row to the next it may not be known whether or not platen 90 needs to be pivoted. As sensor array 40 is moved horizontally or vertically across paper 120, however, navigational and positional feedback information are generated dynamically regarding the alignment of subsequently-dispensed invisible ink marks which permits a determination by microcontroller 80 (see FIG. 8) of whether platen 90 needs to be pivoted or otherwise adjusted positionally in respect of paper 120.

Figure 6:
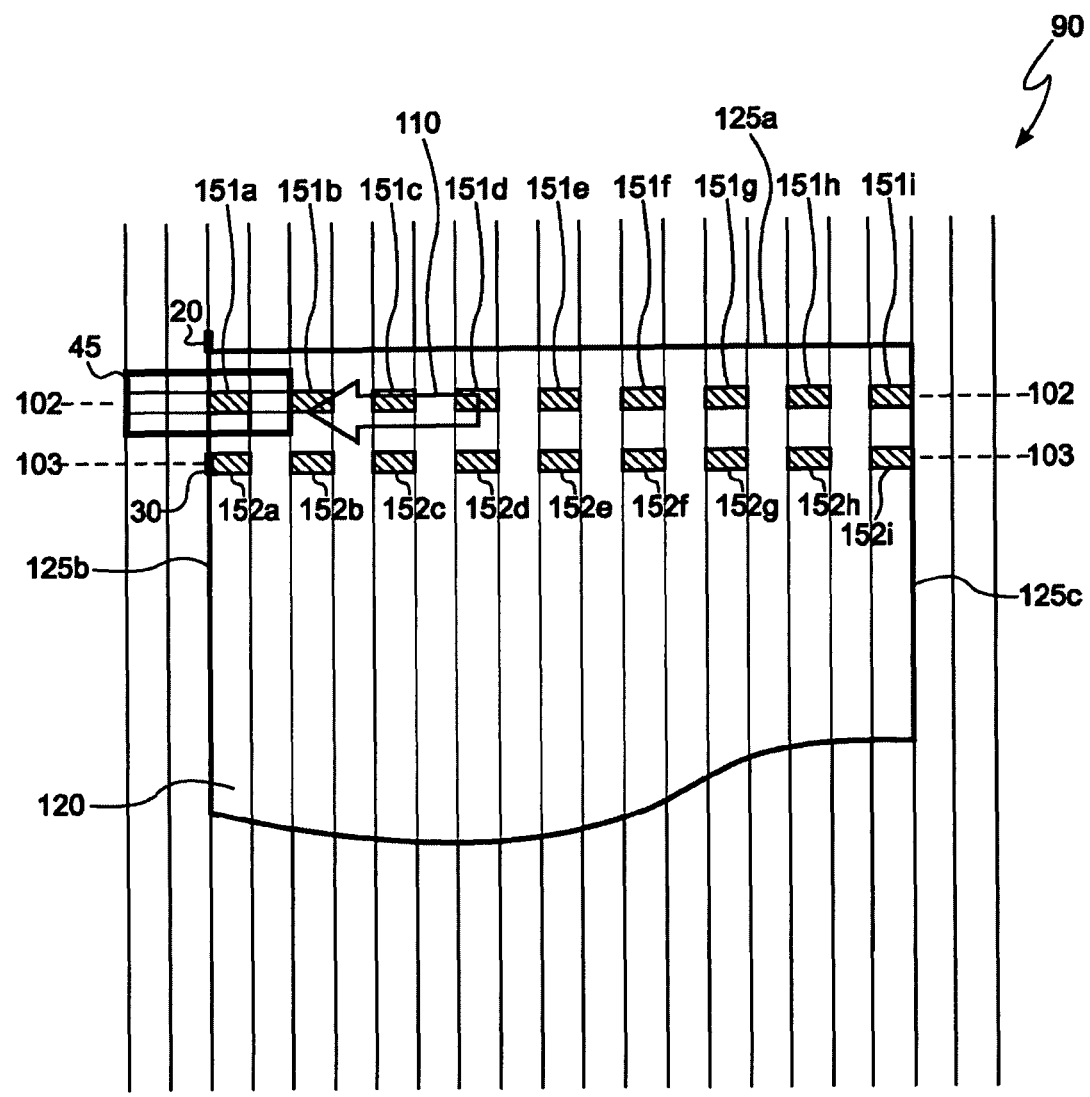
FIG. 6 shows assembly 45 aligning with invisible ink landmark 151a on sheet of paper 120 after having dispensed invisible ink landmarks 152a-152i on sheet of paper 120 along row 103.
Figure 7:
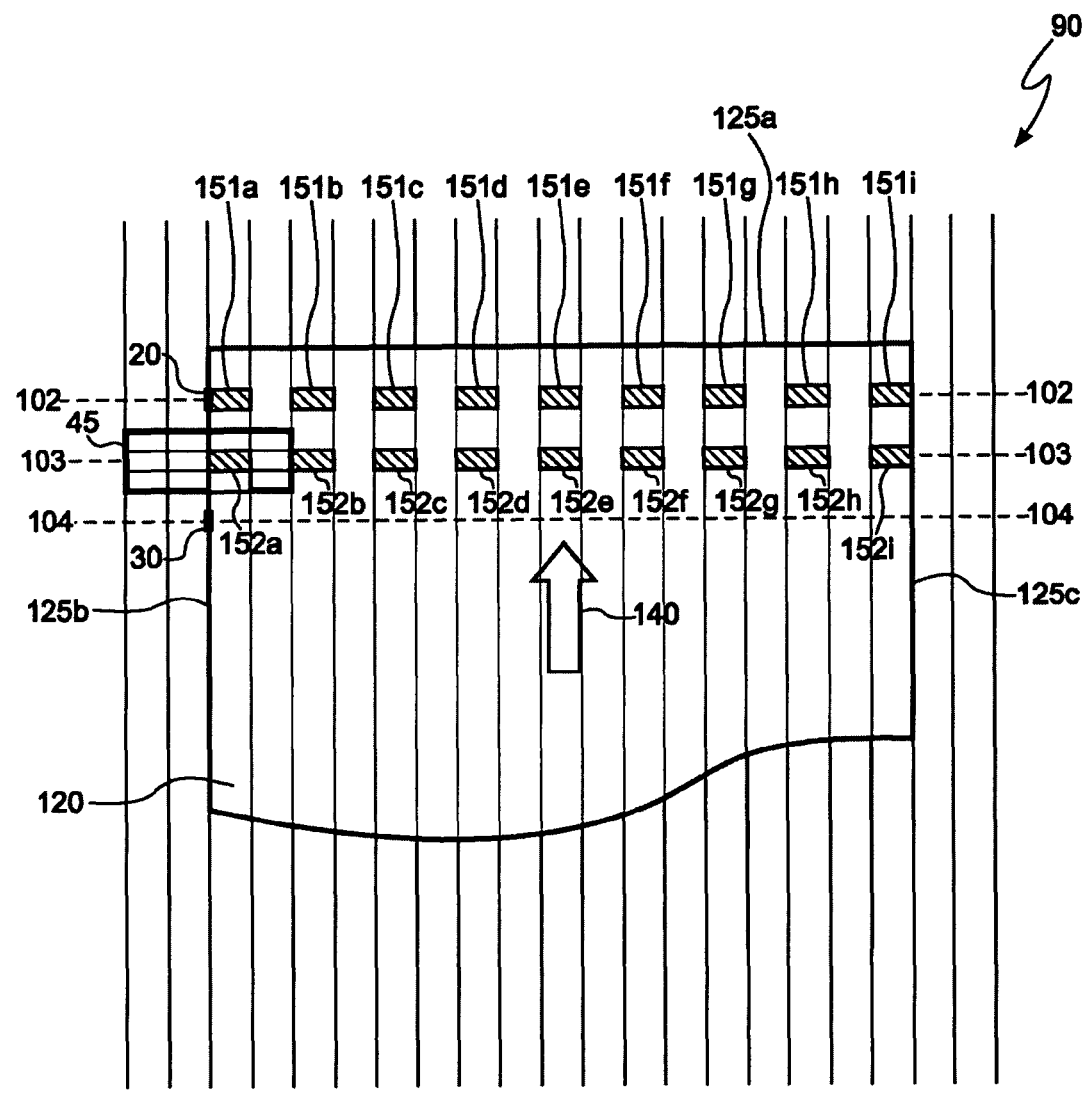
FIG. 7 shows assembly 45 aligning with invisible ink landmark 152a on sheet of paper 120 after paper 120 has been advanced again in upward direction 140.

Once proper registration of paper 120 in respect of assembly 45 has been confirmed, and further as shown in FIG. 6, assembly 45 moves horizontally leftwards from its initial right-most position of FIG. 5, and while doing so dispenses invisible ink landmarks 152*i* through 152*a* of third row 103 onto paper 120 until invisible ink landmark 151*a* is detected by sensor (2,3). Next, and as shown in FIG. 7, paper 120 is advanced upwards by the paper advance mechanism, and paper 120 is positioned as required in respect of assembly 45 such that registration and alignment are achieved. Upon having been so registered and positioned, invisible ink dispenser 30 is ready to dispense invisible ink landmarks along fourth row 104.

As will now be seen, system or printer 10 of the present invention essentially reproduces continuously and sequentially on sheet of paper 120 registration information initially provided by permanent invisible ink markers disposed on platform or platen 90. Once the first row of invisible ink landmarks has been printed on paper 120, it and subsequent rows of invisible ink landmarks provide a basis for continuous registration and alignment of sheet of paper 120 as it advances through system or printer 10.

Figure 8:
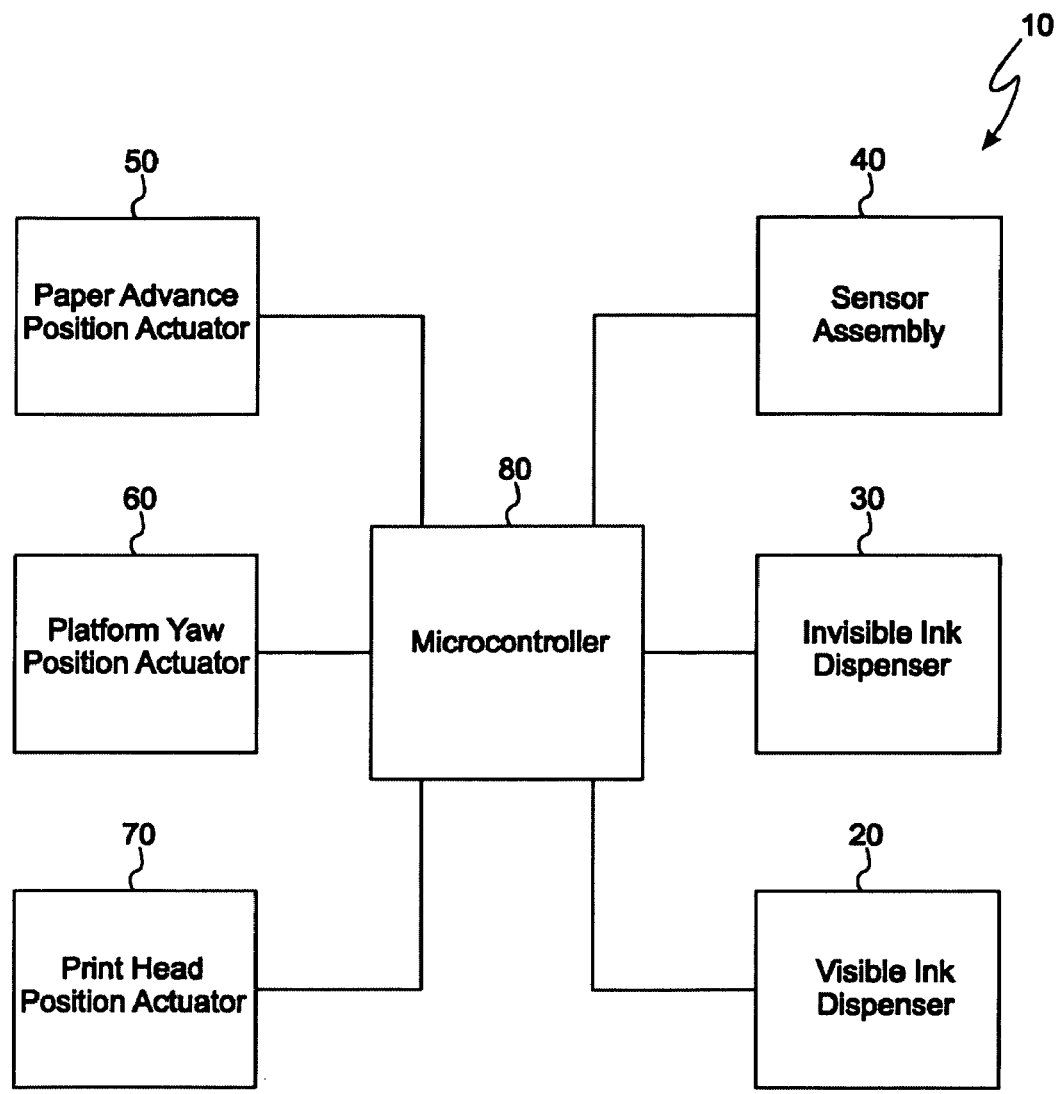
FIG. 8 shows a block diagram of one embodiment of printing registration system 10.

FIG. 8 shows a block diagram of one embodiment of printing registration system or printer 10, which comprises paper advance position actuator 50, sensor array 40, platform yaw position actuator 60, microcontroller 80, invisible ink dispenser 30, print head position actuator 70 and visible ink dispenser 20. Note that microcontroller 80 may be any one or more of a computer, a processor, a microprocessor, a CPU, a controller, an ASIC, or any other computing device containing logic sufficient to control the operation of system or printer 10. Microcontroller 80 is preferably configured to receive and process signals provided by the various sensors of sensor array 40, and employ same to control the operation of paper advance position actuator 50, sensor array 40, platform yaw position actuator 60, microcontroller 80, invisible ink dispenser 30, print head position actuator 70, and visible ink dispenser 20. As those skilled in the art will understand, many variations on and configuration for the methods and means of controlling the operation of the various components illustrated in FIG. 8 are possible.

According to other embodiments, invisible ink dispenser 30 may be mounted on the carriage along with sensor array 40 or another type of imager (such as an imager of the type which commonly finds use in optical mice and which may be adapted and configured to acquire images of portions of sheet of paper 120 at a relatively high frame rate). The sensed or images signals are routed to microcontroller 80 for processing and determination of the position of paper 120 in respect of other system components (e.g., the carriage, sensor array 40, etc.)

In one such embodiment, sensor array 40 or the imager first identifies a physical landmark such as the top left corner of sheet of paper 120 and an invisible ink spot is deposited at some offset from that corner. For example, if the top left corner of paper 120 is coordinate (0,0), then the first spot may be placed at (−10, 10), the second spot at (−10, 20), the third spot at (−10, 30), and so on across paper 120 thereby to create a first row of invisible ink landmarks which employ some portion of an edge of sheet of paper 120 as a reference. Note that during the process of actually depositing such spots on paper 120 an offset between the targeted nominal positions and the actual deposition may occur. Sensor array 40 or the imager, in conjunction with microcontroller 80, is preferably configured to identify such offsets so the absolute position of each spot is known. Determining the absolute position of the first row of invisible dots and detecting them as the second row of dots is deposited allows the second row of dots to be deposited at, by way of example, locations (−20, 10), (−20, 20), (−20, 30) on the paper. Deviations of such spots from desired absolute or nominal positions are once again determined so that the absolute positions of the spots are known and appropriate paper registration may be effected as required.

In another embodiment, each row of invisible ink landmarks is printed during a first pass of the carriage, and a second separate pass of the carriage is employed to dispense visible ink. In a preferred method, however, invisible ink landmarks are dispensed independently of visible ink dispensing, but are printed over by visible ink after the landmarks have already been used to sense paper position and effect registration. Such a method permits a single carriage and imager to be employed, thereby minimizing cost.

In still another embodiment, the absolute positions of invisible ink landmarks laid down on sheet of paper 120 are measured and calculated using multiple sensor arrays or an imager. In some of the above-described embodiments, invisible ink landmarks are dispensed and laid down in a blind manner. That is, sensor array 40 is positioned over invisible ink landmarks arranged along a most recently printed row, and it is assumed that the landmarks being printed in the subsequently deposited row are aligned properly due to the mechanical spacing between array 40 and invisible ink dispenser 30. To determine the absolute position of a given invisible ink landmark deposited on sheet of paper 120, at least a second sensor or sensor array, or a second image, can be used to observe where each mark is actually laid down on sheet of paper 120. One or more of a corner and an edge of a sheet of paper 120 can also be used to aid in determining the absolute positions of invisible ink landmarks on sheet of paper 120. As those skilled in the art will now understand, the means by which such absolute positions of invisible ink landmarks on sheet of paper 120 may be determined are many.

In yet another embodiment, sheet of paper 120 is pre-printed with invisible landmarks which are configured for detection by sensor array 40 or other suitable type of invisible ink detector or imager. Such a configuration eliminates the need to provide invisible ink dispenser 30 in system or printer 110. Additionally, such pre-printed paper could be employed to provide very high quality printing outputs, as the invisible landmarks disposed thereon could be fabricated with high precision respecting alignment and registration.

One of the reasons why closed-loop registration or alignment of a print head or carriage in respect of a sheet of paper has been difficult to achieve in the prior art is because paper has relative large expanses of area devoid of significant features that can be used as positional references. As described above, landmarks can be deposited on a sheet of paper to provide such references. In another embodiment of the invention, however, an edge or corner of sheet of paper 125 is employed as an initial positional reference on the basis of which subsequent invisible ink landmarks are printed on sheet of paper 125, which eliminates the need for having permanent invisible ink markers disposed on platen or platform 90. Initial invisible ink landmarks printed on sheet of paper 120, the positions of which are determined using at least one of a corner or edge of sheet of paper 120, are then used to determine the positions of invisible ink landmarks subsequently-dispensed on sheet of paper 120. As in the embodiments described above, by printing landmarks with invisible ink, navigation across sheet of paper 120 can be done using sensors or imagers that operate outside the visible light spectrum while the printed output observed by humans is not corrupted or affected.

In one embodiment employing a corner or edge of sheet of paper 120 as an initial reference for determining the positions of one or more initial invisible ink landmarks that are to be dispensed subsequently on sheet of paper 120, an imager is used. When sheet of paper 120 is fed into system or printer 10, the imager is initially positioned to observe the upper left-hand corner of sheet of paper 120. The imager has a plurality of pixels arranged in rows and columns, which are appropriately positioned over the upper right-hand corner of sheet of paper 120 such that the vertical and horizontal edges of the forming the corner can be sensed. An image is acquired which shows the position of such corner with respect to the imager. The position of the imager is known relative to the print carriage. If the carriage's travel in the horizontal direction is fixed, it is preferred that platen or platform 90, or the print carriage upon which the imager is mounted, be pivotable or otherwise positionally adjustable so that the imager made be made "square" (i.e., appropriately and accurately registered and aligned) in respect of the observed corner.

Invisible ink dispenser 30 then deposits, in a predetermined location on sheet of paper 120, a first invisible ink landmark on sheet of paper 120 that is nominally or substantially the same size and/or shape as the predetermined pixel (or predetermined group of pixels) corresponding thereto in the imager. The location of the first landmark respecting such predetermined pixel is determined by the imager working in conjunction with microcontroller 80, which processes a first image acquired by the imager to determine such location. Any mis-registration, offset in position, or error in alignment or registration between the first landmark and the predetermined pixel is determined by microcontroller 80 by processing and analyzing the image in a manner well known to those skilled in the art.

Next, a second invisible ink landmark is deposited by system or printer 10 on sheet of paper 10, where the second landmark is offset from the first landmark. The location of the second landmark respecting the same or another predetermined pixel or group of pixels is determined by the imager working in conjunction with microcontroller 80, which processes another image acquired by the imager to determine such location. Any mis-registration, offset in position, or error in alignment or registration between the second landmark and such predetermined pixel is determined by microcontroller 80 by processing and analyzing the image.

Microcontroller 80 can now determine the absolute positions of the first and second landmarks on sheet of paper 120 with respect to the upper left-hand corner of sheet of paper 120 and indeed the remainder of sheet of paper 120. The process of depositing invisible ink landmarks on sheet of paper 120 and determining the positions of invisible ink landmarks on sheet of paper 120 continues until the opposite upper right-hand corner of sheet of paper 120 is sensed using frames or images acquired by the imager. The imager is aligned with the upper right-hand corner, and if printer or system 10 is so configured, platform 90 or the printer carriage is tilted or pivoted to bring sheet of paper 120 and the carriage into registration and alignment with one another as required.

Next the imager and print carriage are moved vertically downwards to a new row, and the process is repeated. As new rows of invisible ink landmarks are deposited on sheet of paper 10, more information for registration and alignment of the print carriage in respect of sheet of paper 120 becomes available, and multiple pixels in each image acquired by the imager can be employed to determine the absolute positions of invisible ink landmarks on sheet of paper 120. In a preferred embodiment, at least two invisible ink landmarks, or one invisible ink landmark and an edge of sheet of paper 120, are within the field of view of the imager at all times, which increases the accuracy of registration between the print carriage and sheet of paper 120. The imager printing registration system described above can therefore be configured so that positional errors do not accumulate. Moreover, the imager printing registration system described herein may also be configured to sense or observe the bottom edge of sheet of paper 120 as it advances through printer or system 10.

Examples of optical mouse imagers and imaging systems that may be adapted for use in the present invention include, but are not limited to, those disclosed in U.S. Pat. No. 6,433,780 to Gordon et al. entitled "Seeing eye mouse for a computer system" dated Aug. 13, 2002; U.S. Pat. No. 5,786,804 to Gordon entitled "Method and system for tracking attitude" dated Jul. 28, 1998; and U.S. Pat. No. 6,995,748 to Gordon et al. entitled "Apparatus for controlling a screen pointer with a frame rate based on velocity" dated Feb. 7, 2006. Each of the foregoing patents is hereby incorporated by reference herein, each in its respective entirety.

Note that the terms "vertical," "horizontal," "in," "on," "under," "above" and "below" employed herein are intended to refer to the relative orientations, positions and locations of invisible ink landmarks 151a-151i, permanent ink markers 100a-100i, sheet of paper 120, ink dispensers 20 and 30, the print cartridge containing invisible ink dispensers 290 and 26 and the ink reservoirs corresponding thereto, sensor array 40, assembly 45, the carriage upon which assembly 45 is mounted or forms a portion thereof, platform or platen 90, and the paper advance mechanism, and other components of system 10 as they relate spatially to one another. Those skilled in the art will understand that many orientations and locations of such components respecting one another are possible and will nevertheless fall within the scope of the present invention.

For example, in one embodiment paper is feed in a downward direction through system or printer 10 and the carriage head is located beneath or above sheet of paper 120 as it is fed through printer 20. In another embodiment, platform or platen 90 is located above sheet of paper 120, and the carriage is located beneath paper 120 as it is fed through system or printer 10. In further embodiments, either or both of permanent invisible ink marks 100a-100i and invisible ink landmarks 151a-151i are arranged in one or a combination of vertical columns and horizontal rows disposed along platform 90 and sheet of paper 120, respectively, and sensor array 40, the carriage corresponding thereto and microcontroller 80 are configured to detect markers and landmarks arranged in such rows and/or columns and effect paper registration in response thereto.

Note further that invisible ink landmarks and permanent invisible ink markers need not be configured in a rectangular or square shape, and may instead form dots, circles, ovals or any other shape which permits detection of the landmark or marker and adequate registration of paper 120 in system or printer 10. Various types of photodetectors, visible inks, invisible inks, and printing cartridge configurations known in the art but not explicitly disclosed herein may also be employed in various embodiments of the invention.

Various embodiments of the invention have advantages which include, but are not limited to, one or more of permitting the mechanical tolerances of some printer components to become looser and therefore less expensive, reduced cost of mechanical components, increased printing registration and alignment accuracy, faster printing registration and alignment, faster printer speed, increased printing resolution, and enabling the use of known mouse-like imagers in printing registration systems with greatly reduced accumulated errors respecting the prior art.

Included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

I claim:

1. A method of registering a sheet of paper in a printer, comprising:
    aligning at least one of an edge or a corner of a sheet of paper with at least portions of one or more permanent invisible ink markers disposed on, in or under a platform located beneath or above the sheet;
    aligning at least portions of a sensor assembly with one or more of at least portions of the one or more permanent invisible ink markers and at least portions of one or more invisible ink landmarks that have previously been dispensed on the sheet, and
    dispensing a plurality of invisible ink paper registration landmarks onto the sheet of paper in response to the sensors detecting at least one of at least some of the permanent invisible ink markers and at least some of the invisible ink landmarks.

2. The method of claim 1, further comprising pivoting the sheet of paper to align the edge with the at least portions of one or more of the permanent invisible ink markers and at least portions of one or more of the invisible ink landmarks.

3. The method of claim 1, further comprising utilizing at least one of a top edge, a side edge, and a bottom edge of the sheet as the edge for alignment with the at least portions of the one or more permanent invisible ink markers and the at least portions of one or more of the invisible ink landmarks.

4. The method of claim 1, further comprising configuring the permanent invisible ink markers in at least one of a horizontally-oriented row and a vertically-oriented column.

5. The method of claim 1, further comprising dispensing the invisible ink paper registration landmarks along at least one of a horizontally-oriented row and a vertically-oriented column on the sheet.

6. The method of claim 1, further comprising registering the deposition of a subsequently-applied row of invisible ink landmarks on the sheet using a first-applied row of invisible ink landmarks on the sheet.

7. The method of claim 1, further comprising dispensing visible ink onto the sheet at or about the same time as invisible ink landmarks are being dispensed onto the sheet.

8. The method of claim 1, further comprising incorporating the visible ink dispenser and the invisible ink dispenser into one of a single assembly and a single cartridge.

9. The method of claim 1, further comprising incorporating the visible ink dispenser and the invisible ink dispenser into different and physically separate assemblies.

10. The method of claim 1, further comprising pivoting the sheet of paper such that the edge is aligned in a predetermined orientation with respect to at least one of the permanent invisible ink marks and the invisible ink landmarks.

11. The method of claim 1, further comprising providing the plurality of sensors as a sensor array.

12. The method of claim 1, further comprising confirming, with the sensor assembly, the presence and proper alignment and registration of at least one of the invisible ink markers and the invisible ink landmarks.

13. The system of claim 1, further comprising providing invisible ink for the invisible ink dispenser, the invisible ink comprising one or more of an ultraviolet (UV) dye or an infrared (IR) dye which fluoresces when exposed to a UV or IR light source, respectively.

14. A method of registering a sheet of paper in a printer, comprising:
   aligning an edge and a corner of a sheet of paper with a sensor assembly or an imager;
   dispensing an invisible ink paper registration landmark onto the sheet of paper;
   determining the position of the invisible ink landmark using the sensor assembly or the imager, and
   registering or aligning a print carriage with respect to the sheet of paper on the basis of the position of the invisible ink landmark.

15. The method of claim 14, wherein the print carriage is moved to effect registration and alignment between the carriage and sheet of paper.

16. The method of claim 14, wherein the sheet of paper is moved to effect registration and alignment between the carriage and the sheet of paper.

* * * * *